(12) United States Patent
Kvaalen et al.

(10) Patent No.: US 10,127,714 B1
(45) Date of Patent: Nov. 13, 2018

(54) SPHERICAL THREE-DIMENSIONAL VIDEO RENDERING FOR VIRTUAL REALITY

(71) Applicant: Google Inc., Mountain View, CA (US)

(72) Inventors: Sam Kvaalen, San Francisco, CA (US); Anjali Wheeler, Pacifica, CA (US); Richard Leider, San Francisco, CA (US)

(73) Assignee: Google LLC, Mountain View, CA (US)

(*) Notice: Subject to any disclaimer, the term of this patent is extended or adjusted under 35 U.S.C. 154(b) by 29 days.

(21) Appl. No.: 14/606,787

(22) Filed: Jan. 27, 2015

(51) Int. Cl.
| | |
|---|---|
| *G06T 15/20* | (2011.01) |
| *G06T 5/00* | (2006.01) |
| *G06T 19/20* | (2011.01) |
| *G06T 5/50* | (2006.01) |

(52) U.S. Cl.
CPC ............ *G06T 15/205* (2013.01); *G06T 5/002* (2013.01); *G06T 5/003* (2013.01); *G06T 5/50* (2013.01); *G06T 19/20* (2013.01); *G06T 2207/10016* (2013.01); *G06T 2207/20221* (2013.01); *G06T 2215/06* (2013.01); *G06T 2215/16* (2013.01); *G06T 2219/2008* (2013.01)

(58) Field of Classification Search
CPC ....... G06T 15/205; G06T 5/002; G06T 5/003; G06T 5/50; G06T 19/20
See application file for complete search history.

(56) References Cited

U.S. PATENT DOCUMENTS

| | | | |
|---|---|---|---|
| 6,791,598 B1* | 9/2004 | Luken | H04N 13/026 348/36 |
| 7,176,960 B1* | 2/2007 | Nayar | G06T 3/4038 348/207.99 |
| 2011/0096832 A1 | 4/2011 | Zhang et al. | |
| 2011/0188773 A1* | 8/2011 | Wei | G06K 9/40 382/260 |
| 2011/0285813 A1* | 11/2011 | Girdzijauskas | H04N 13/0011 348/42 |
| 2013/0044108 A1* | 2/2013 | Tanaka | G06T 15/04 345/419 |
| 2013/0329985 A1* | 12/2013 | Helin | H04N 13/0011 382/154 |
| 2014/0146132 A1 | 5/2014 | Bagnato et al. | |
| 2016/0246061 A1* | 8/2016 | Bickerstaff | G06F 3/012 |

* cited by examiner

*Primary Examiner* — King Poon
*Assistant Examiner* — Vincent Peren
(74) *Attorney, Agent, or Firm* — Lowenstein Sandler LLP

(57) ABSTRACT

Systems and methods are disclosed for spherical three dimensional video rendering for virtual reality. A method includes receiving a spherical two-dimensional (2D) input image and a corresponding spherical depth map to be used in a creation of a spherical three-dimensional (3D) video, determining, by a processing device, a pixel shift value for each pixel of the spherical 2D input image based on the spherical depth map, and generating, based on the spherical 2D input image and the pixel shift values, a modified spherical image, wherein the modified spherical image in combination with the spherical 2d input image comprises at least one frame in the spherical 3D video.

20 Claims, 7 Drawing Sheets

US 10,127,714 B1

SPHERICAL THREE-DIMENSIONAL VIDEO RENDERING FOR VIRTUAL REALITY

TECHNICAL FIELD

This disclosure relates to the field of image processing and, in particular, to spherical three dimensional video rendering for virtual reality.

BACKGROUND

Spherical video provides a full 360 degree image encapsulating the point of view of the recording device (e.g., camera). Spherical video viewed with a virtual reality (VR) device (e.g., VR headset) is able to make a user feel as if he or she is immersed in the place being viewed. Currently, most spherical videos do not offer a depth component. Instead, the spherical videos are a set of two-dimensional (2D) (also referred to as "monoscopic") images wrapped around the user. Modifying the spherical video to be three-dimensional (3D) (also referred to as "stereoscopic") contributes to the immersion experience for the user.

Advances in display technology have caused display devices capable of conveying a stereoscopic perception of 3D depth to a view to become increasingly common. These 3D displays may be found in high-definition (HD) television sets, gaming devices, and other computing devices. The growing number of 3D displays has led to a need for additional 3D visual content (e.g., images, video), such as rendering spherical video in a 3D format. However, current solutions for rendering 3D spherical video have been suboptimal because the existing solutions do not look natural and generally only work when the user is looking in a particular direction (i.e., will not work when a user tilts their head or looks in certain directions).

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the present disclosure, a method includes receiving a spherical two-dimensional (2D) input image and a corresponding spherical depth map to be used in a creation of a spherical three-dimensional (3D) video, determining, by a processing device, a pixel shift value for each pixel of the spherical 2D input image based on the spherical depth map; and generating, based on the spherical 2D input image and the pixel shift values, a modified spherical image, wherein the modified spherical image in combination with the spherical 2d input image comprises at least one frame in the spherical 3D video.

In one implementation, the spherical depth map is generated by comparing two images captured by a pair of cameras of a recording device, the two cameras facing in a same direction, for each pixel of a first image of the two images identifying a corresponding pixel in a second image of the two images, the identifying based on a color value for the pixel and determining a distance in terms of number of pixels separating the pixel and the identified corresponding pixel in the two images, and assigning the determined distances as a depth value for the pixel in a depth map corresponding to the pair of cameras. The spherical depth map is further generated by stitching the depth map together with other depth maps generated for other pairs of cameras of the recording device facing in other directions, the stitching to generate the spherical depth map.

In another implementation, the color value for pixel is based on the color space Y—Cb—Cr. Furthermore, the spherical 2D input image may include a plurality of 2D input images captured by cameras facing in different directions on a recording device, the plurality of 2D input images stitched together to create the spherical 2D input image.

In some implementations, determining the pixel shift value further includes applying depth values of the spherical depth map to a view rendering algorithm. The method may also include filtering the spherical depth map, wherein the filtering comprises applying at least one of a smoothing filter or a sharpening filter.

In addition, generating the modified spherical image in the method may include removing pixels in the modified spherical image that are hidden as a result of a view disparity, and inpainting a void in the modified spherical image created as a result of the view disparity. Lastly, generating the modified spherical image in the method may be performed for a portion of the spherical 3D video requested for viewing.

Computing devices for performing the operations of the above described method and the various implementations described herein are disclosed. Computer-readable media that store instructions for performing operations associated with the above described method and the various implementations described herein are also disclosed.

BRIEF DESCRIPTION OF THE DRAWINGS

The present disclosure is illustrated by way of example, and not by way of limitation, in the figures of the accompanying drawings.

DETAILED DESCRIPTION

Aspects and implementations of the present disclosure are directed to spherical three-dimensional (3D) video rendering for virtual reality. Implementations are described for capturing a spherical color video and a spherical depth video from a single point of view, and then providing the two points of view used for 3D rendering by displaying the spherical color video with the spherical depth video. In one implementation, a scene is filmed using two cameras facing in each direction. Then each pair of cameras is used to create a depth video (also referred to as a "depth map" or a "depth map video") for that direction (e.g., using 3D reconstruction). Once a depth video is created for each direction filmed in, the depth videos are stitched together to create a spherical depth video. A spherical color video is also created by stitching together the captured images from one of the sets of cameras.

The spherical depth video may then be combined with the spherical color video to generate the spherical 3D video. In one implementation, combining the spherical depth video with the spherical color video is accomplished by simulating the depth of each pixel via pushing the pixel left or right depending on its associated depth. A modified spherical video may be created from the images of the spherical color video with the shifted pixels (in accordance with the spherical depth video). The combination of the spherical color video and the modified spherical video may be used to generate the spherical 3D video.

Existing 3D video rendering technologies use two cameras side by side in each direction, simulating the two eyes of a viewer. When the images are played back to a viewer, the image from the right camera is displayed to the right eye and the image from the left camera is displayed to the left eye. However, in the case of spherical video, this 3D rendering technique is not effective as there is no longer a 1-to-1 mapping of 1 camera to 1 eye (due to the viewing user's ability to look and move around). Implementations of the present disclosure overcome this problem as the spherical 3D video rendering does not rely on a 1-to-1 mapping of camera to eye, and instead utilizes a single color video displayed to both eyes of a viewing user with the 3D effect generated by applying depth to the projected view. One beneficial result of implementations of the disclosure is a lower video file size. For example, for 3D video utilizing implementations of the disclosure, a single color video and a single depth video are used instead of two color videos of previous solutions. Streaming two color high-resolution videos uses more bandwidth than just a single color and single depth video. In addition, the depth video may potentially be provided in a lower resolution than full resolution, resulting in additional bandwidth savings.

Figure 1:
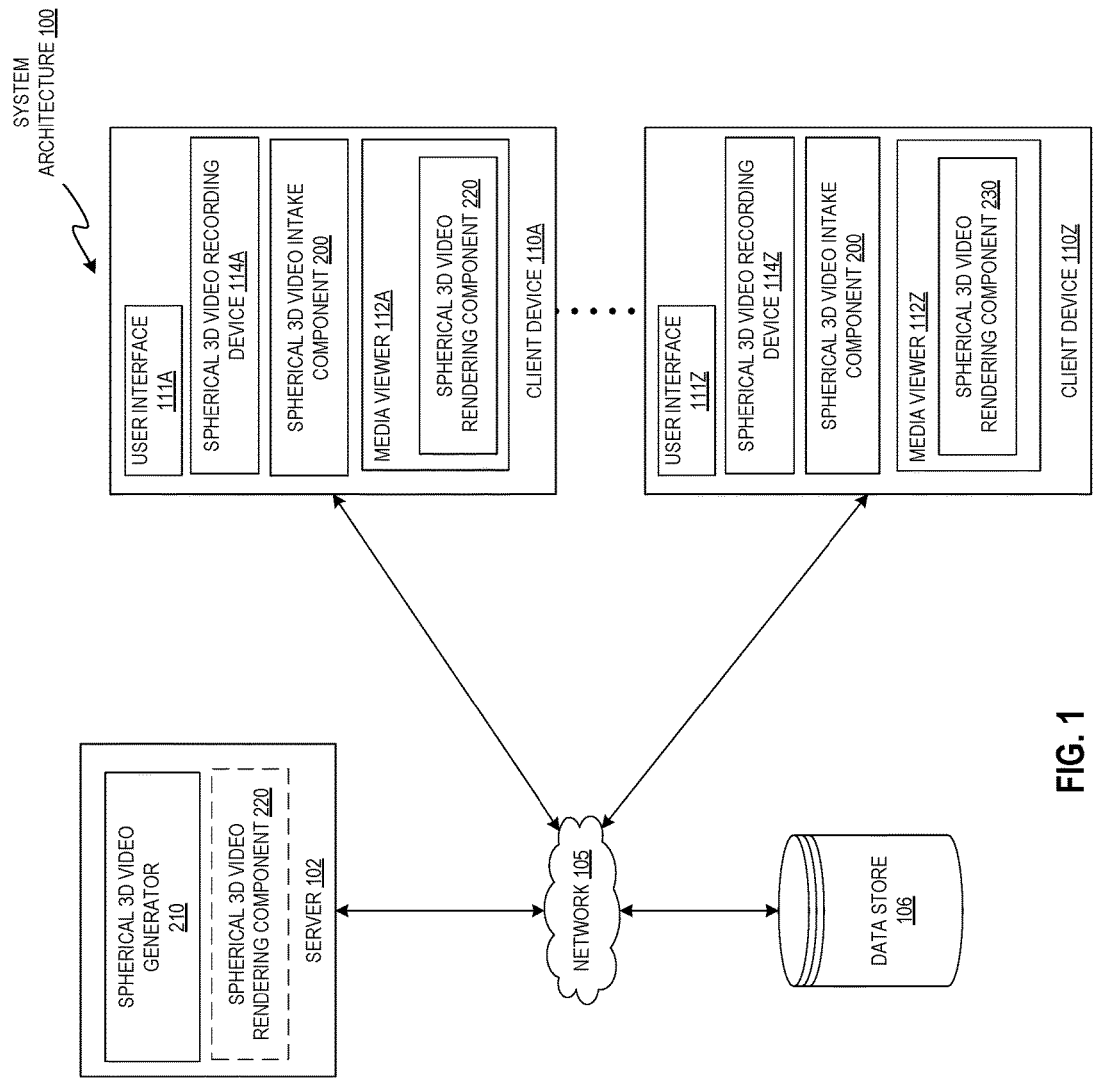
FIG. 1 is a block diagram illustrating an exemplary network architecture in which implementations of the present disclosure may be implemented.

FIG. 1 is a block diagram illustrating an exemplary network architecture in which implementations of the present disclosure may be implemented. The network architecture 100 may include one or more servers 102 communicating with one or more user devices 110A-110Z over one or more networks 105, according to one implementation. Network 105 can be a local area network (LAN), a wireless network, a telephone network, a mobile communications network, a wide area network (WAN), such as the Internet, or similar communication system. User devices 110A-110Z may be any type of computing device including server computers, gateway computers, desktop computers, laptop computers, mobile communications devices, cell phones, smart phones, hand-held computers, tablets, or similar computing devices. The user devices 110A-110Z may be variously configured with different features to enable viewing of visual content, such as images, videos, etc.

Server 102 may include a network-accessible server-based functionality, various data stores, and/or other data processing equipment. The server 102 may be implemented by a single machine or a cluster of machines. Server 102 may include, for example, computer system 700 of FIG. 7.

The client devices 110A-110Z may each implement the user interfaces 111A-111Z, respectively. Each of user interfaces 111A-111Z may allow a user of the respective client device 110A-110Z to send and receive information to server 102. For example, one or more of the user interfaces 111A-111Z may be a web browser interface that can access, retrieve, present, and/or navigate content (e.g., web pages such as Hyper Text Markup Language (HTML) pages) provided by the server 102. In one implementation, one or more of the user interfaces 111A-111Z may be a standalone application (e.g., a mobile app, conferencing software, etc.), that allows a user of a respective client device 110A-110Z to send and receive information to the conference server 102.

Each client device 110A-110Z further includes a media viewer 112A-112Z, respectively. In one implementation, the media viewers 112A-112Z may be applications that allow users to view content, such as images, videos, web pages, documents, etc. For example, the media viewer 112A may be a web browser that can access, retrieve, present, and/or navigate content (e.g., web pages such as Hyper Text Markup Language (HTML) pages, digital media items, etc.) served by a web server. The media viewer 112A may render, display, and/or present the content to a user. The media viewer 112A may also display a media player that is embedded in a web page (e.g., a web page that may provide information about a product sold by an online merchant). In another example, the media viewer 112A may be a standalone application (e.g., a mobile app) that allows users to view digital media items (e.g., digital videos, digital images, electronic books, etc.). In one implementation, media viewers 112A-112Z may further allow for video to be received from one or more sources and displayed within the respective user interfaces 111A-111Z. For example, client device 110A may receive video data from server 102, which may correspond to video streams generated by one or more additional client devices. The media viewer 112A may generate for display (e.g., within the user interface 111A) video corresponding to each of the video streams based on the received video data.

In one implementation, client device 110A-110Z includes a spherical 3D video intake component 200. Spherical 3D video intake component 200 can receive input from a 3D spherical video recording device 114A-114Z (e.g., may be a hardware device that is part of client device 110A-110Z or a hardware device that is communicably coupled to the client device 110A-110Z). For example, a 3D spherical video recording device 114A-114Z may include pairs of cameras facing in multiple directions (e.g., 2 cameras facing up, 2 cameras facing down, etc.). As a result, the input from the 3D spherical video recording device 114A-114Z may include the multiple images (e.g., frames) recorded from each of those cameras. These multiple images (e.g., frames), when sequenced together, create a video. Spherical 3D video intake component 200 processes and prepares the received input for upload to the server 102. For example, spherical 3D video intake component 200 may use the input to generate, using stitching techniques, a spherical color video (e.g., in 2D format) and a spherical depth video associated with the spherical color video. A color video may refer to a data representation of the color values and luminance information corresponding to a plurality of captured images. A depth video may refer to a data representation of how far away each pixel is from a point of view of a recording device in each of a plurality of image frames.

In one implementation, server 102 includes spherical 3D video generator 210. Spherical 3D video generator 210 can receive an input spherical color image and associated depth map (e.g., from spherical 3D video intake component 200) that is to be processed for rendering as a spherical 3D output video. Using the received input spherical color image and depth map, spherical 3D video generator 210 can automatically generate a spherical 3D output video, as will be described below.

Media viewers 112A-112Z may also include a spherical 3D video rendering component 220 to display the output spherical 3D video via media viewer 112A-112Z. Spherical 3D video rendering component 220 may be customized to receive and process an output spherical 3D video for display as a spherical 3D video on the client device 110A-110Z.

Data store 106 may include one or more mass storage devices which can include, for example, flash memory, magnetic or optical disks, or tape drives, read-only memory (ROM); random-access memory (RAM); erasable programmable memory (e.g., EPROM and EEPROM); flash memory; or any other type of storage medium. In one implementation, data store 106 includes an image data store including a number of input spherical images as well as modified output spherical images that form the spherical 3D video. In addition, data store 106 may store the depth map information associated with each input spherical image, as well as other user and content data.

In one implementation server 102 may include spherical 3D video generator 210 and data store 106. In another implementation, storage device 106 may be external to server 102 and may be connected to server 102 over a network or other connection. In some implementations, server 102 may include spherical 3D video intake component 200 and/or spherical 3D video rendering component 220. Similarly, client device 110A-110Z may also include spherical 3D video generator 210. In other implementations, server 102 may include different and/or additional components which are not shown here so as not to obscure the present disclosure.

Figure 2:
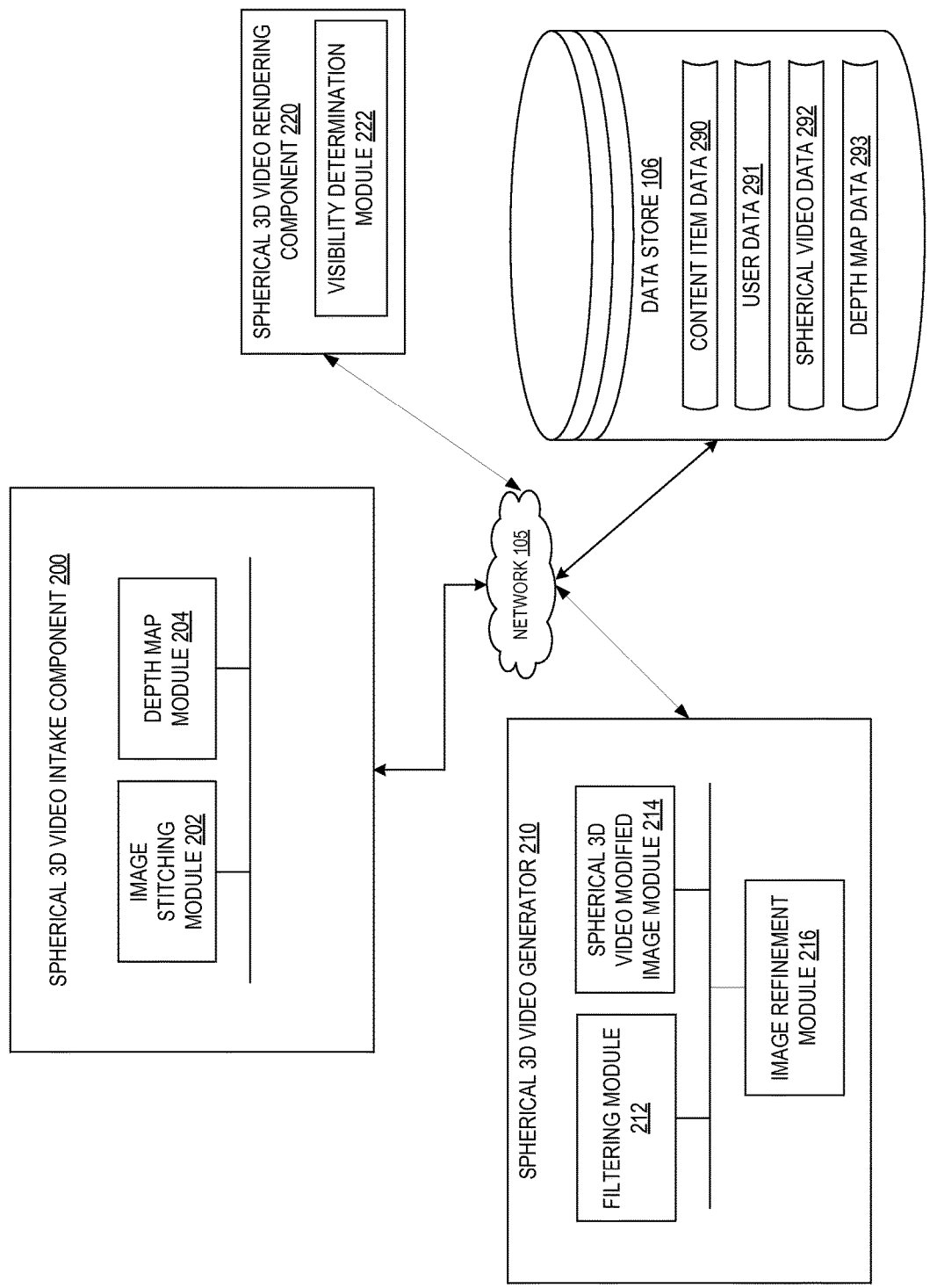
FIG. 2 is a block diagram illustrating a spherical 3D video intake component, a spherical 3D video generator for generation of a spherical 3D video, and a spherical 3D video rendering component, according to an implementation.

FIG. 2 is a block diagram illustrating a spherical 3D video intake component 200, a spherical 3D video generator 210 for generation of a spherical 3D video, and a spherical 3D video rendering component 220, according to an implementation of the present disclosure. In one implementation, spherical 3D video intake component 200 may be the same as its counterpart described with respect to FIG. 1. Spherical 3D video intake component 200 may include an image stitching module 202 and a depth map module 204. This arrangement of modules may be a logical separation, and in other implementations, these modules or other components can be combined together or separated in further components, according to a particular implementation.

In one implementation, spherical 3D video generator 210 may be the same as its counterpart described with respect to FIG. 1. Spherical 3D video generator 210 may include a filtering module 212, a spherical 3D modified image module 214, and an image refinement module 216. This arrangement of modules may be a logical separation, and in other implementations, these modules or other components can be combined together or separated in further components, according to a particular implementation. In one implementation, spherical 3D video intake component 200 and spherical 3D video generator 210 may be communicably coupled to data store 106 via network 105. Data store 106 and network 105 may be the same as their counterparts described with respect to FIG. 1. Data store 106 may include content item data 290, user data 291, spherical video data 292, depth map data 239, and modified image data 294.

In one implementation, spherical 3D video intake component 200 can receive input from a 3D spherical video recording device, such as, for example, 3D spherical video recording device 114A-114Z describe with respect to FIG. 1. The 3D spherical recording device may include pairs of cameras facing in multiple directions (e.g., 2 cameras facing up, 2 cameras facing down, etc.). Image stitching module 202 combines one set of the camera inputs (e.g., an input from one camera in each direction) together (in a process known as "stitching") to create a single spherical color video.

Depth map module 204 uses each pair of cameras to create a depth video for that direction. In one implementation, 3D reconstruction is used to generate the depth video. The 3D reconstruction may determine how far away each object is in an image frame based on how many pixels away the object is shifted between the two input images. In one implementation, the spherical color video may be stored in spherical video data 292 of data store 106

Depth map module 204 may determine a depth value for at least a portion of the pixels in a 2D input image. In one implementation, depth map module 204 extracts Y-Cb-Cr values for a particular pixel in a first input image for a particular direction (e.g., corresponding to a $1^{st}$ camera recording in that direction) and uses the Y-Cb-Cr values to locate the counterpart pixel in a second input image for that direction (e.g., corresponding to a $2^{nd}$ camera recording in the same direction). A depth value for the pixel is then determined based on the number of pixels found between the located pixels in the two input images. In other implementations, the depth map module 204 may extract and use one of or a combination of the Cr or Cb values, a different color scheme, or another feature value altogether in order to locate corresponding pixels in the two input images to determine the proper depth values. In some implementations, a window of pixels surrounding a target pixel is referenced when calculating depth.

The depth values may be combined based on pixel location, to generate a depth map. The depth map relates the distances of objects in the image from a viewpoint. Once a depth map is generated for each of the directions, the depth maps are stitched together (e.g., by image stitching module 202) to create a spherical depth map video. In one implementation, the depth map is a black and white video where, for example, the shading may be proportional to the distance of the surfaces of scene objects from the viewpoint in the source image. In this implementation, darker colors indicate a depth that is closer to the viewpoint, while lighter colors indicate a depth that is further away. In other implementations, the shading may be reversed. Depth map module 204 may store the depth values, for example, in data store 106 as depth map data 293.

In one implementation, the spherical color video and the spherical depth map video are then used by spherical 3D video generator 210 to generate a spherical 3D video. The spherical color video and the spherical depth map video may be provided (e.g., uploaded) to a system of the spherical 3D video generator as a single file, where the spherical depth map video is saved in the alpha channel of the spherical color video.

Using the spherical color video input image data 292 and depth map data 293, the various modules of spherical 3D video generator 210 can automatically generate a spherical 3D output video that may be stored as modified image data 294. In one implementation, filtering module 212, spherical 3D modified image module 214, and image refinement module 216 are used to generate the spherical 3D video from the input video (spherical color video and depth map video) in data store 106.

Filtering module 212 optionally applies one or more filters to the depth map generated by depth map module 204 to improve the quality of the depth map. In one implementation, filtering module 212 may receive the depth map as an input and filter the depth map in order to achieve better results when the depth map is used by spherical 3D modified image module 214 to create a modified image. The filtering module 212 may apply any number of smoothing and/or sharpening filters to the depth map. In one implementation, filtering module 212 uses a median filter to smooth out anomalies in the depth map and a bilateral filter is applied to sharpen the edges of the objects in the depth map. In other implementations, filtering module 212 uses other filters to improve the quality of the depth map. For example, a mean filter may be used to smooth or a high pass filter may be used to sharpen.

Upon completion of the filtering, spherical 3D modified image module 214 may apply the depth values from the filtered depth map to a view rendering algorithm that determines how much to shift each pixel in the spherical input image. In one implementation, to generate a 3D view, each pixel from the spherical input color image is rendered differently for each eye. For example, each pixel has a corresponding color value and a depth value, but, based on the position of the eye, the pixel is rendered more to the left or the right for the eye. The shifting of the objects between each eye's view is dependent on the depth value for the pixel.

This algorithm applied by spherical 3D modified image module 214 may be based, for example, on the MPEG N8038 algorithm, or any other algorithm that receives a depth values as an input and outputs a pixel shift value. In one implementation, a pixel shift may be created in one direction (i.e. left or right from the input image). In another implementation, the pixel could be shifted in both directions, resulting in some modified images being shifted to the left, and some to the right. In another implementation, the pixels could be shifted in the vertical direction instead of or in addition to a horizontal shift. In a further implementation, the pixels are shifted in and out in a 3D space. The resulting pixel shift may be applied to the input image to generate the modified spherical image. The modified spherical image may be stored in the modified image data 294 of data store 106.

In one implementation, spherical 3D modified image module 214 calculates a pixel shift value for each pixel, or at least a subset of the pixels, in the spherical input image. The pixel shift value may be based, for example, on the depth value of the associated pixel (e.g., which is obtained from depth map module 204). The calculated pixel shift value may be inversely proportional to the depth value, such that a pixel with a lower depth value (i.e., indicating that the object represented by the pixel is closer to the viewpoint of the image) has a larger pixel shift value. In other implementations, the view rendering algorithm may take into account different and/or additional information besides depth values (e.g., such as view disparity). The above process may be repeated to generate additional frames of the spherical 3D video.

In one implementation, the image refinement module 216 takes the modified spherical image generated by the spherical 3D modified image module 214 as an input and replaces any pixels from the modified spherical image that are to be hidden due to the change in view disparity and fills in any voids in the modified spherical image that were created due to the pixel shift. In one implementation, the pixel replacement or removal may be referred to as "toeing in" and the filling of voids may be referred to as "inpainting." For example, if the spherical input image shows a single tree in front of a backdrop of mountains, the modified spherical image may show the same tree and the same mountains, but from a different view point. Areas of the mountains that were hidden behind the tree before may become visible, and areas that were visible before may now be hidden behind the tree. The image refinement module 216 may account for these types of occurrences by generating new pixels and replacing pixels in the modified spherical image. Areas where the mountain is now visible may be filled in with mountain-colored pixels and areas were the mountain should now be hidden behind the tree may be replaced by pixels similar in color to the tree.

The generated and refined spherical input and modified images may then be provided to a spherical 3D video rendering component 220 for display as a spherical 3D video. In one implementation, the spherical 3D video rendering component 220 is the same as its counterpart described with respect to FIG. 1. Spherical 3D video rendering component 220 may receive the input and modified spherical 3D images generated by spherical 3D video generator 210 that, when presented sequentially, form the 3D spherical video.

In one implementation, spherical 3D video rendering module 320 may include a visibility determination module 222 determines a portion of the spherical 3D video that a user indicates he or she would like to view (e.g., by moving VR headset in a particular direction or selecting direction indicators associated with the spherical 3D video). Spherical 3D video rendering component 220 may present the combination of the input and modified spherical images together to create a 3D view by projecting the visible portion of the spherical 3D video (including a different rendered view for each eye) onto a rectangular surface that fills the user's view and includes the portion of the spherical video that is visible to the user (as determined by visibility determination module 222).

In some implementations, the spherical 3D video generator 210 applies the filtering module 212, spherical 3D modified image module 214, and image refinement module 216 to just those portions of the spherical 3D video that are visible to the user. This implementation may reduce the amount of processing power and resources used to generate the spherical 3D video rendering. In such an implementation, the spherical 3D video generation and rendering may occur on the same device (e.g., client device or server device) or on different devices.

Although implementations of the disclosure have been described above as using one color video and one depth video, other implementation may use two color videos (one for each eye) and one depth video, or two color videos and two depth videos (e.g., the objects are shifted relative to each eye's point of view and therefore depth is too).

Figure 3:
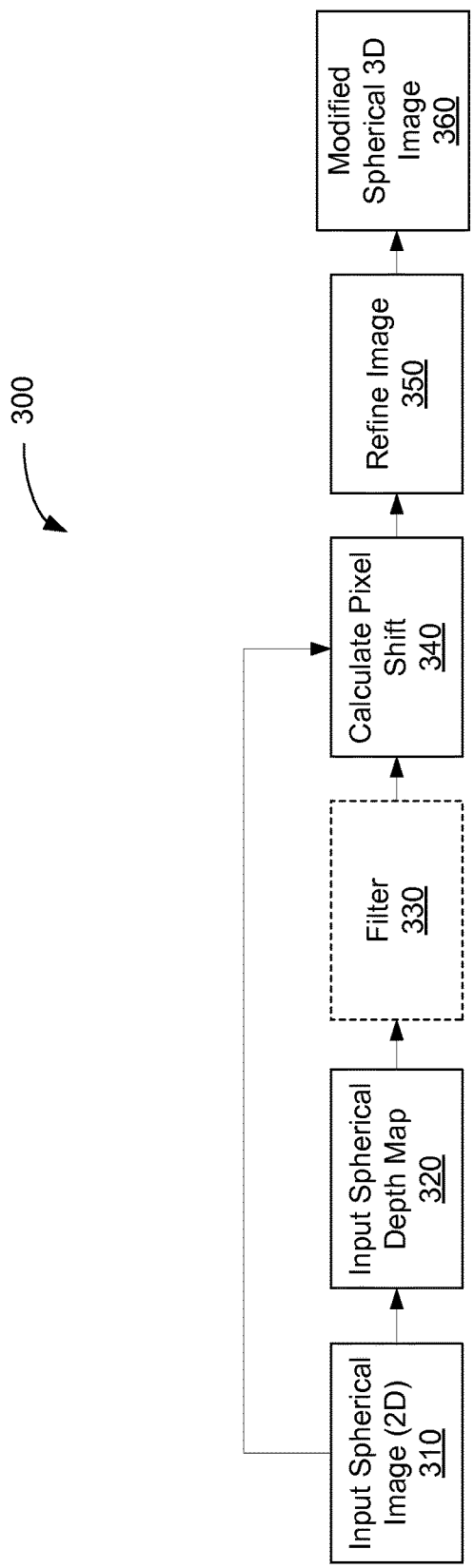
FIG. 3 is a block diagram illustrating a spherical 3D video generator processing flow, according to an implementation.

FIG. 3 is a block diagram illustrating a spherical 3D video generator processing flow, according to an implementation of the present disclosure. The various modules and components may be described in regards to their roles in generating a spherical 3D video from input spherical 2D images. In one implementation, the processing flow 300 begins with receiving a 2D spherical input image at block 310. At block 320, a spherical depth map input corresponding to the 2D spherical input image is received. This spherical depth map may have been generated by comparing 2 images recorded in each direction of the spherical image capture to determine pixel displacement (i.e., depth value) for each pixel in the image. These depth values may be combined into a depth map that is a representation of the depth values of the individual pixels in the input image.

At block 330, the resulting depth map may optionally be filtered to reduce any anomalies in the depth values. A smoothing or a sharpening filter may be used to refine the depth map so that more accurate pixel shift values may be generated. At block 340, a pixel shift is calculated according to the filtered depth map from block 330. The depth map may be inputs to a function that generates a pixel shift value for a plurality of pixels in the input image. At block 350, a modified spherical 3D image generated at block 340 is refined by replacing pixels in the image that may no longer be visible due to the change in view disparity, and filling any voids where pixels may now be visible. At block 360, the final modified spherical 3D image is created.

Figure 4:
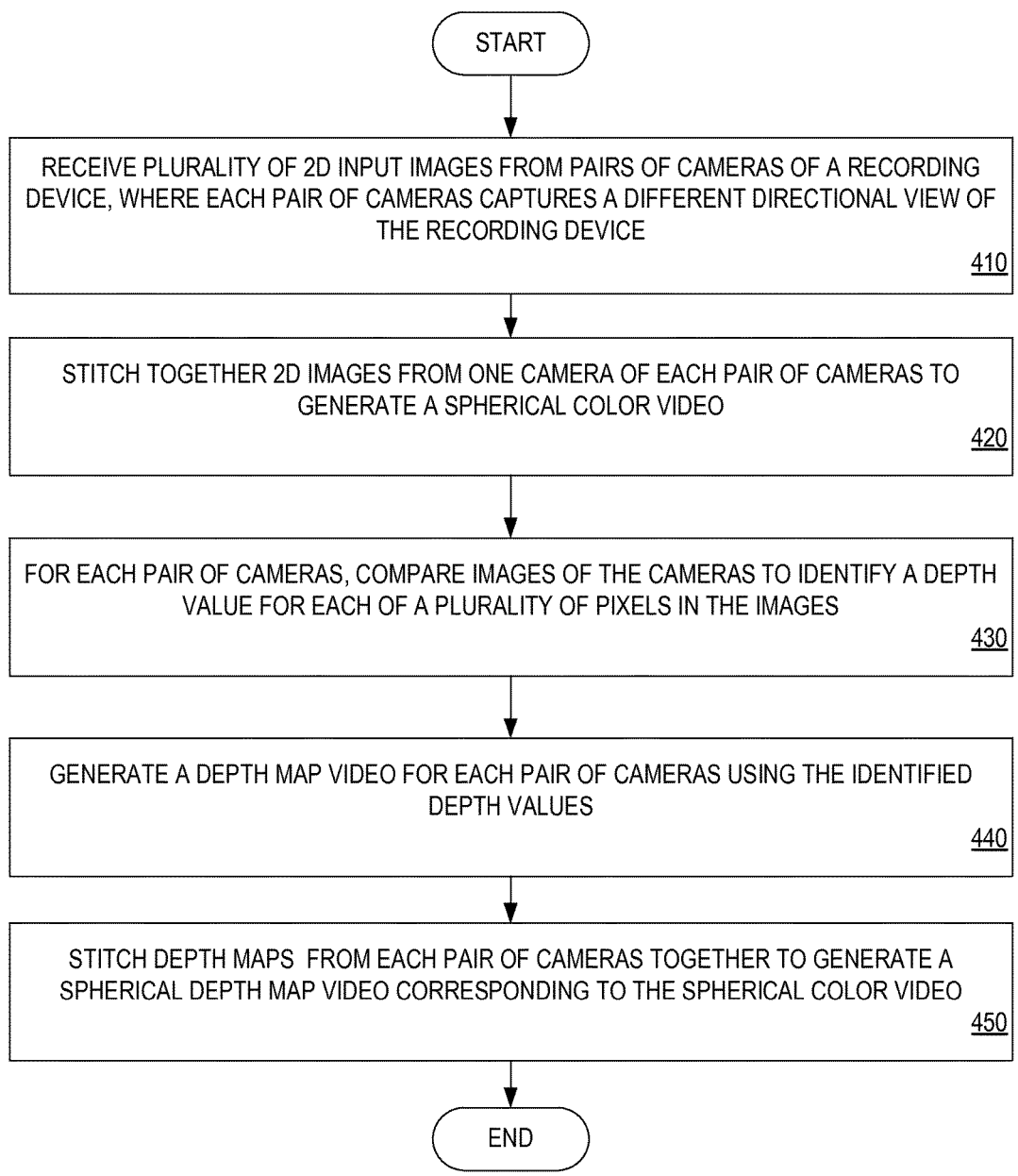
FIG. 4 is a flow diagram illustrating a method for intake of a spherical video for spherical 3D video generation, according to an implementation.

FIG. 4 is a flow diagram illustrating a method 400 for intake of a spherical video for spherical 3D video generation according to an implementation of the present disclosure. The method 400 may be performed by processing logic that comprises hardware (e.g., circuitry, dedicated logic, programmable logic, microcode, etc.), software (e.g., instructions run on a processing device to perform hardware simulation), or a combination thereof. In one implementation, method 400 may be performed by spherical 3D intake component 200 as shown in FIGS. 1 and 2.

Referring to FIG. 4, at block 410, method 400 receives a plurality of 2D input images from pairs of cameras of recording device. Each pair of camera captures a single direction from the point of view of the recording device, where the pairs of cameras capture images from multiple directions. At block 420, 2D images from one camera of each direction/pair are stitched (e.g., combine images and smooth edges) together to generate a spherical color video.

Then, at block 430, for each camera pair, the camera images are compared to identify a depth value for each of a plurality of pixels in the input images. In one implementation, the depth values are determined by identifying identical pixels from each image and determining how far apart (in terms of number of pixels) the identified pixels are from each other in the corresponding images. In one implementation, color values are used to locate identical pixels and may be based on the Y-Cb-Cr color scheme or any other color scheme such as RGB or CMYK.

At block 440, method 400 generates a depth map for each pair of cameras (e.g., direction) using the identified depth values. Then, at block 450, the depth videos for each direction are stitch together to generate a spherical depth map video for the spherical color video. In one implementation the depth map may be a visual representation of the depth values in an image. In another implementation the depth map may be a list of depth values associated with pixel locations for a particular image.

Figure 5:
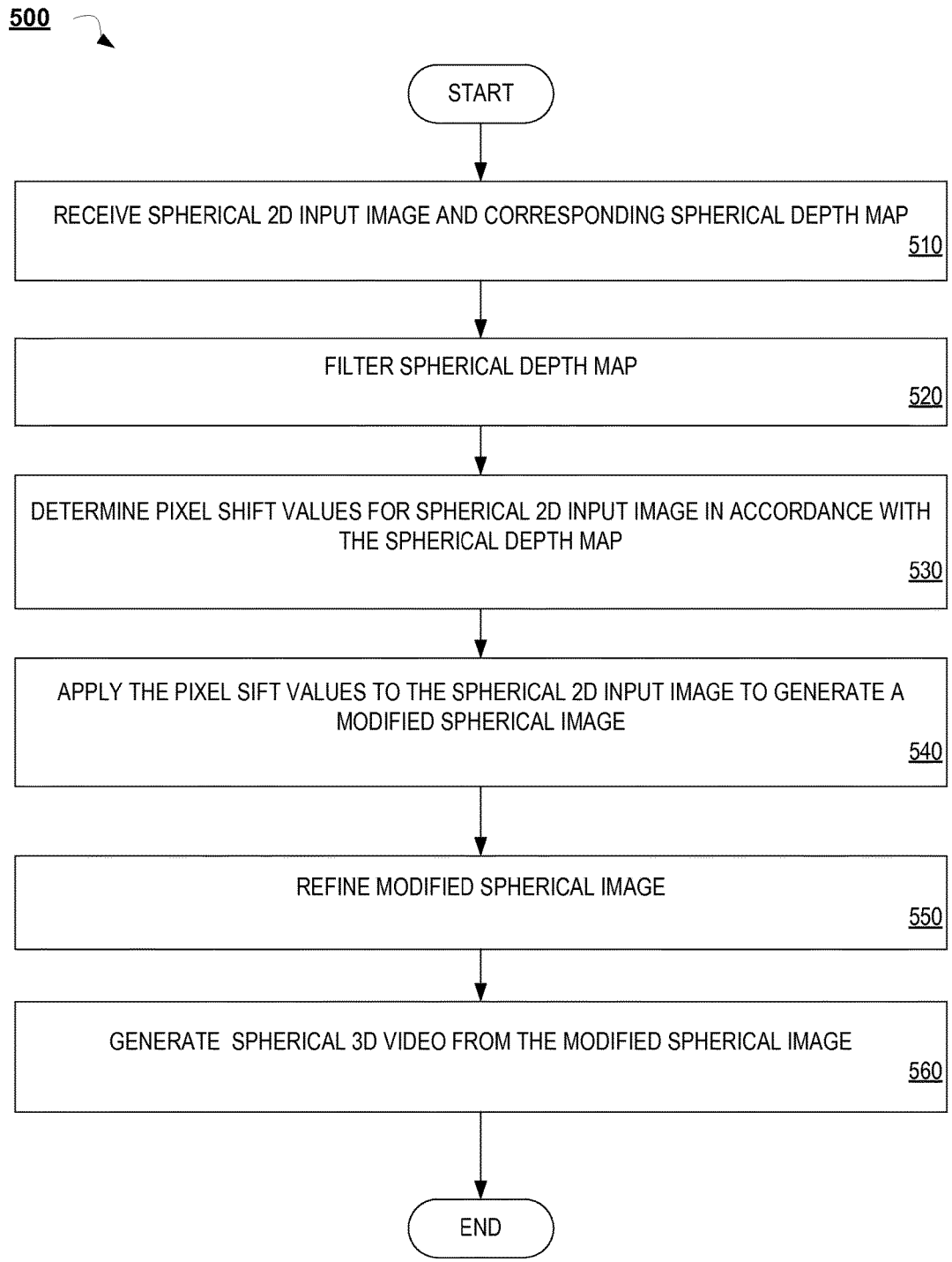
FIG. 5 is a flow diagram illustrating a method for generating a spherical 3D modified image, according to an implementation.

FIG. 5 is a flow diagram illustrating a method 500 for generating a spherical 3D modified image according to an implementation of the present disclosure. The method 500 may be performed by processing logic that comprises hardware (e.g., circuitry, dedicated logic, programmable logic, microcode, etc.), software (e.g., instructions run on a processing device to perform hardware simulation), or a combination thereof. In one implementation, method 500 may be performed by spherical 3D video generator 210 as shown in FIGS. 1 and 2.

Referring to FIG. 5, at block 510, method 500 receives a spherical 2D input image (also referred to herein a spherical color video) and a corresponding spherical depth map (also referred to herein as a spherical depth map video). At block 520, method 500 optionally filters the spherical depth map. Filtering may be performed to remove the anomalies introduced by the determination of depth values from a particular color scheme. By filtering the depth map to smooth out the anomalies or sharpen the edges of the subjects in an image, the resulting depth map may be a more accurate representation of the actual depth values in the input image. In one implementation, a median filter may be used to smooth the depth map or a bilateral filter may be used to sharpen the depth map. In another implementation, a different smoothing or sharpening filter may be used. In another implementation, different types of filters altogether may be used or no filters at all.

At block 530, method 500 generates pixel shift values according to the depth map and applies the pixel shift values to the spherical input image to generate a modified spherical image. In one implementation, a pixel shift is calculated based on an algorithm such as MPEG N8038. In another implementation, a different algorithm may be used. At block 540, method 500 applies the pixel shift values to the spherical input image to generate a modified spherical image.

Subsequently, at block 550, method 500 refines the modified spherical image. An algorithm may be used to replace pixels in the modified spherical image that may now be hidden due to the change in view disparity and resulting pixel shift. In one implementation, the pixels which are hidden may be replaced with the pixels representing an object that is now in front of the hidden pixels. The modified spherical image may be further modified by using an algorithm to fill in voids in the modified spherical image where pixels need to be generated due to the change in view disparity and resulting pixel shift. In one implementation, the voids may be filled in the modified image by replacing the blank pixels with the color of a nearest neighboring pixel. In another implementation an average of all of the nearest neighbors' colors may be calculated and used to fill voids in the modified image.

Lastly, at block 560, method 500 generates a spherical 3D video, where the pixel-shifted values of the modified spherical image are used to render views for each eye of a viewing user. In one implementation, the spherical 3D video includes both the spherical input image and the pixel-shifted modified spherical image that together provide the views for each eye of the viewing user.

Figure 6:
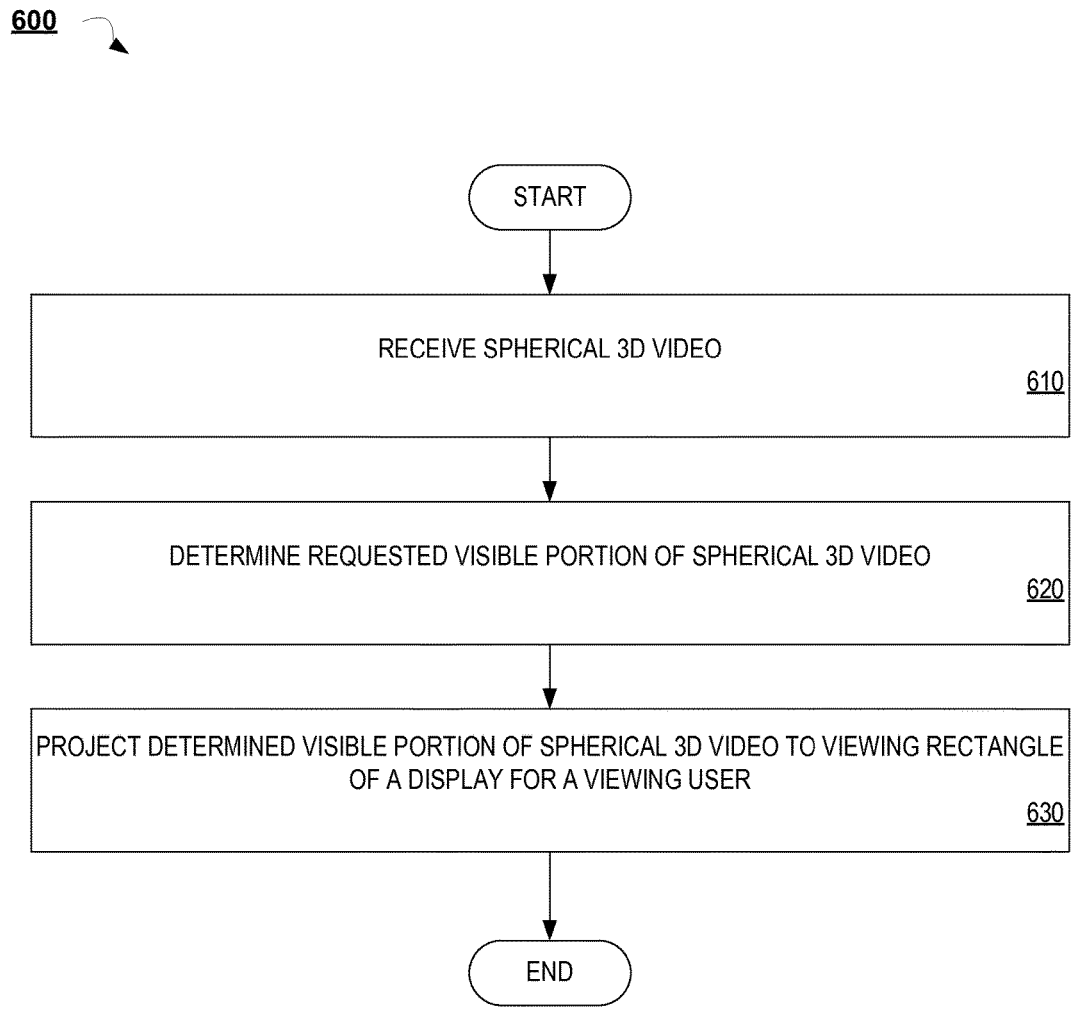
FIG. 6 is a flow diagram illustrating a method for rendering a spherical 3D video, according to an implementation.

FIG. 6 is a flow diagram illustrating a method 600 for rendering a spherical 3D video according to an implementation of the present disclosure. The method 600 may be performed by processing logic that comprises hardware (e.g., circuitry, dedicated logic, programmable logic, microcode, etc.), software (e.g., instructions run on a processing device to perform hardware simulation), or a combination thereof. In one implementation, method 600 may be performed by spherical 3D video rendering component 220 as shown in FIGS. 1 and 2.

Referring to FIG. 6, at block 610, method 600 receives a spherical 3D video. In one implementation, the spherical 3D video may comprise pixel-shifted images used for rendering a view for each eye of the viewing user. At block 620, a requested visible portion of the spherical 3D video is determined. In one implementation, a movement of a viewing user with respect to the VR headset is utilized to determine the visible portion of the spherical 3D video. In another implementation, a selection of a direction indicator (e.g., arrow button, cursor, etc.) with respect to the spherical 3D video is used to determine the visible portion of the spherical 3D video. Lastly, at block 630, the visible portion of the spherical 3D video is projected to a viewing rectangle of a display for the viewing user.

In some implementations, method 500 described with respect to FIG. 5 is performed subsequent to determine a visible portion of a spherical 3D video at block 620 of FIG. 6. In this case, the filtering, pixel-shifting, and image refinement of method 500 are performed on the visible portion of the 3D spherical video at the time of viewing (e.g., rendering) and not beforehand.

Figure 7:
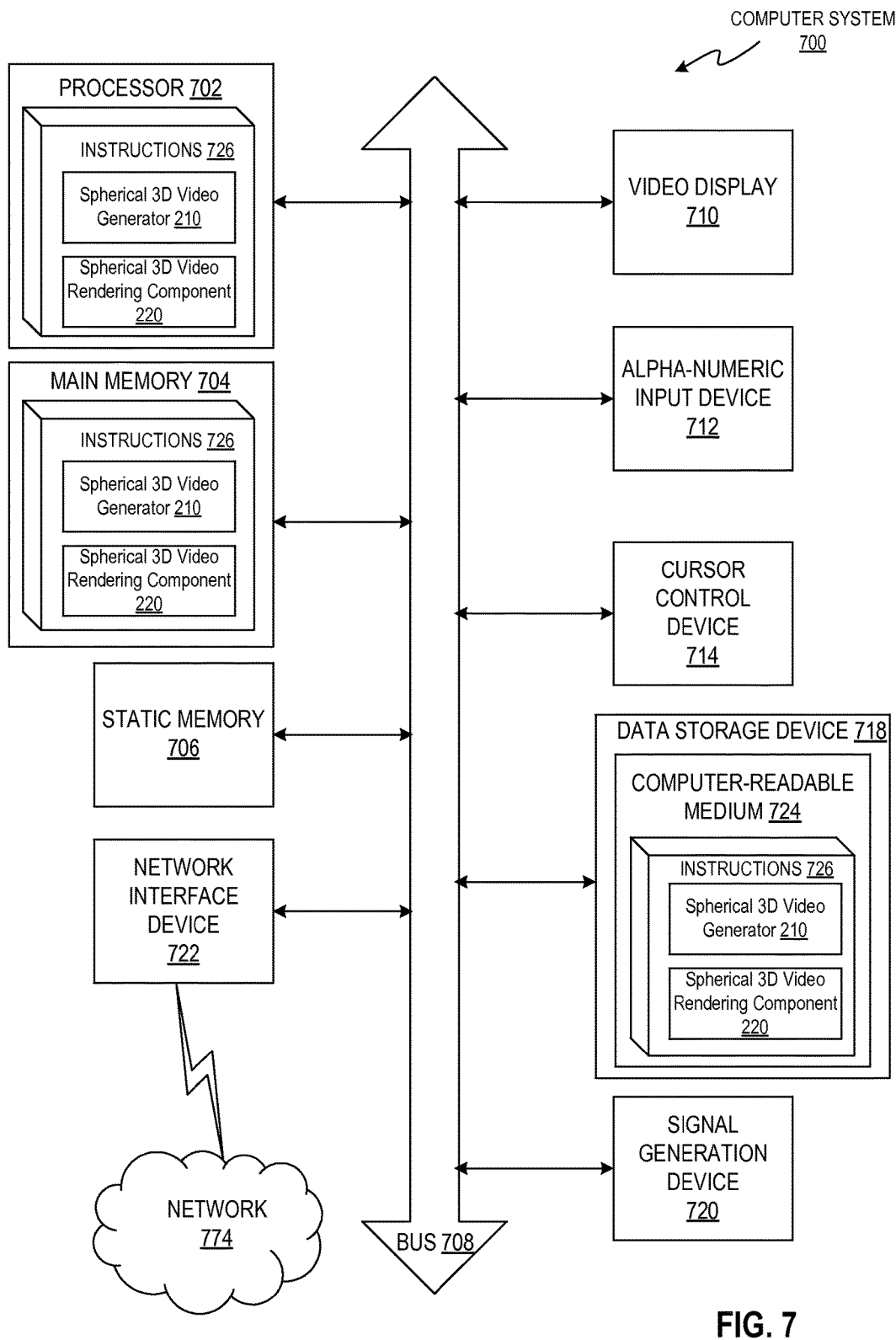
FIG. 7 is a block diagram illustrating one implementation of a computer system, according to an implementation.

FIG. 7 illustrates a diagrammatic representation of a machine in the exemplary form of a computer system 700 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, computer system 700 may be representative of a server, such as server 102, running a spherical 3D video generator 210 and/or a spherical 3D video rendering component 220, as described with respect to FIGS. 1 and 2.

The exemplary computer system 700 includes a processing device 702, a main memory 704 (e.g., read-only memory (ROM), flash memory, dynamic random access memory (DRAM) (such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 702 is configured to execute processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-readable storage medium 728, on which is stored one or more set of instructions 722 (e.g., software) embodying any one or more of the methodologies of functions described herein. The instructions 722 may also reside, completely or at least partially, within the main memory 704 and/or within the processing device 702 during execution thereof by the computer system 700; the main memory 704 and the processing device 702 also constituting machine-readable storage media. The instructions 722 may further be transmitted or received over a network 720 via the network interface device 708.

The machine-readable storage medium 728 may also be used to store instructions to perform a method for spherical 3D video rendering for virtual reality, as described herein. While the machine-readable storage medium 728 is shown in an exemplary implementation to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

What is claimed is:

1. A method comprising:
    receiving a spherical two-dimensional (2D) input image and a corresponding spherical depth map to be used in a creation of a spherical three-dimensional (3D) video wherein the spherical depth map is saved in an alpha channel of the spherical 2D input image;
    filtering the spherical depth map, wherein the filtering comprises applying both of a smoothing filter and a sharpening filter to the spherical depth map;
    determining, by a processing device, a pixel shift value for each pixel of the spherical 2D input image based on the filtered spherical depth map;
    determining, based on user input received from the user device, a first portion of the spherical 3D video that is indicated to be visible on a user device;
    determining a second portion of the spherical 2D input image and a third portion of the pixel shift values that each correspond to the first portion of the spherical 3D video;
    generating, using the second portion of the spherical 2D input image and using the third portion of the pixel shift values, a modified spherical image for the first portion of the spherical 3D video, wherein the modified spherical image in combination with the spherical 2D input image comprises at least one frame in the spherical 3D video; and
    refining the modified spherical image due to a change in view disparity resulting from application of the pixel shift values, wherein refining the modified spherical image comprises:
        inpainting blank pixels representative of a first portion of the modified spherical image that was not previously visible to the user, wherein the blank pixels are inpainted using pixels of a second portion of the modified spherical image that was previously visible to the user.

2. The method of claim 1, wherein the spherical depth map is generated by:
    comparing two images captured by a pair of cameras of a recording device, the two cameras facing in a same direction;
    for each pixel of a first image of the two images:
        identifying a corresponding pixel in a second image of the two images, the identifying based on a color value for the pixel; and
        determining a distance in terms of number of pixels separating the pixel and the identified corresponding pixel in the two images; and
    assigning the determined distances as a depth value for the pixel in a depth map corresponding to the pair of cameras; and
    stitching the depth map together with other depth maps generated for other pairs of cameras of the recording device facing in other directions, the stitching to generate the spherical depth map.

3. The method of claim 2, wherein the color value for the pixel is based on the color space Y-Cb-Cr.

4. The method of claim 1, wherein the spherical 2D input image comprises a plurality of 2D input images captured by cameras facing in different directions on a recording device, the plurality of 2D input images stitched together to create the spherical 2D input image.

5. The method of claim 1, wherein determining the pixel shift value comprises applying depth values of the spherical depth map to a view rendering algorithm.

6. The method of claim 1, wherein generating the modified spherical image is performed for the determined portion of the spherical 3D video requested for viewing.

7. The method of claim 1, wherein the smoothing filter comprises at least one of a median filter or a mean filter.

8. The method of claim 1, wherein the sharpening filter comprises at least one of a bilateral filter or a high pass filter.

9. A system comprising:
    a processing device; and
    a memory coupled to the processing device; and
    a spherical 3D video generator, executable by the processing device using the memory, to:
        receive a spherical two-dimensional (2D) input image and a corresponding spherical depth map to be used in a creation of a spherical three-dimensional (3D) video, wherein the spherical depth map is saved in an alpha channel of the spherical 2D input image;
        filter the spherical depth map, wherein the filtering comprises applying both of a smoothing filter and a sharpening filter to the spherical depth map;
        determine a pixel shift value for each pixel of the spherical 2D input images based on the filtered spherical depth map;
        determine, based on user input received from the user device, a first portion of the spherical 3D video that is indicated to be visible on a user device;
        determine a second portion of the spherical 2D input image and a third portion of the pixel shift values that each correspond to the first portion of the spherical 3D video;
        generate, using the second portion of the spherical 2D input image and using the third portion of the pixel shift values, a modified spherical image for the first portion of the spherical 3D video, wherein the modified spherical image in combination with the spherical 2D input image comprises at least one frame in the spherical 3D video; and
        refine the modified spherical image due to a change in view disparity resulting from application of the pixel shift values, wherein the processing device to refine the modified spherical image further comprises the processing device to:
            inpaint blank pixels representative of a first portion of the modified spherical image that was not previously visible to the user, wherein the blank pixels are inpainted using pixels of a second portion of the modified spherical image that was previously visible to the user.

10. The system of claim 9, wherein the spherical 3D generator generates the spherical depth map by:
    comparing two images captured by a pair of cameras of a recording device, the two cameras facing in a same direction;
    for each pixel of a first image of the two images:
        identifying a corresponding pixel in a second image of the two images, the identifying based on a color value for the pixel; and
        determining a distance in terms of number of pixels separating the pixel and the identified corresponding pixel in the two images; and
    assigning the determined distances as a depth value for the pixel in a depth map corresponding to the pair of cameras; and stitching the depth map together with other depth maps generated for other pairs of cameras of the recording device facing in other directions, the stitching to generate the spherical depth map.

11. The system of claim 10, wherein the color value for the pixel is based on the color space Y-Cb-Cr.

12. The system of claim 9, wherein the spherical 2D input image comprises a plurality of 2D input images captured by cameras facing in different directions on a recording device, the plurality of 2D input images stitched together to create the spherical 2D input image.

13. The system of claim 9, wherein determining the pixel shift value further comprises applying depth values of the spherical depth map to a view rendering algorithm.

14. The system of claim 9, wherein generating the modified spherical image is performed for the determined portion of the spherical 3D video requested for viewing.

15. A non-transitory machine-readable storage medium storing instructions which, when executed, cause a processing device to perform operations comprising:
receiving a spherical two-dimensional (2D) input image and a corresponding spherical depth map to be used in a creation of a spherical three-dimensional (3D) video, wherein the spherical depth map is saved in an alpha channel of the spherical 2D input image;
filtering the spherical depth map, wherein the filtering comprises applying both of a smoothing filter and a sharpening filter to the spherical depth map;
determining, by a processing device, a pixel shift value for each pixel of the spherical 2D input image based on the filtered spherical depth map;
determining, based on user input received from the user device, a first portion of the spherical 3D video that is indicated to be visible on a user device;
determining a second portion of the spherical 2D input image and a third portion of the pixel shift values that each correspond to the first portion of the spherical 3D video;
generating, using the second portion of the spherical 2D input image and using the third portion of the pixel shift values, a modified spherical image for the first portion of the spherical 3D video, wherein the modified spherical image in combination with the spherical 2D input image comprises at least one frame in the spherical 3D video; and
refining the modified spherical image due to a change in view disparity resulting from application of the pixel shift values, wherein refining the modified spherical image comprises:
inpainting blank pixels representative of a first portion of the modified spherical image that was not previously visible to the user, wherein the blank pixels are inpainted using pixels of a second portion of the modified spherical image that was previously visible to the user.

16. The non-transitory machine-readable storage medium of claim 15, wherein the spherical depth map is generated by:
comparing two images captured by a pair of cameras of a recording device, the two cameras facing in a same direction;
for each pixel of a first image of the two images:
identifying a corresponding pixel in a second image of the two images, the identifying based on a color value for the pixel; and
determining a distance in terms of number of pixels separating the pixel and the identified corresponding pixel in the two images; and
assigning the determined distances as a depth value for the pixel in a depth map corresponding to the pair of cameras; and
stitching the depth map together with other depth maps generated for other pairs of cameras of the recording device facing in other directions, the stitching to generate the spherical depth map.

17. The non-transitory machine-readable storage medium of claim 16, wherein the color value for the pixel is based on the color space Y-Cb-Cr.

18. The non-transitory machine-readable storage medium of claim 15, wherein the spherical 2D input image comprises a plurality of 2D input images captured by cameras facing in different directions on a recording device, the plurality of 2D input images stitched together to create the spherical 2D input image.

19. The non-transitory machine-readable storage medium of claim 15, wherein determining the pixel shift value comprises applying depth values of the spherical depth map to a view rendering algorithm.

20. The non-transitory machine-readable storage medium of claim 15, wherein generating the modified spherical image is performed for the determined portion of the spherical 3D video requested for viewing.

* * * * *